Oct. 17, 1961  R. A. CUNNINGHAM  3,004,708
VACUUM TUBE ATTENUATOR
Filed Feb. 9, 1959

INVENTOR.
ROBERT A. CUNNINGHAM.
BY *Alden W. Redfield*
*Irwin P. Garfinkle*
ATTORNEYS.

United States Patent Office 3,004,708
Patented Oct. 17, 1961

3,004,708
VACUUM TUBE ATTENUATOR
Robert A. Cunningham, Orlando, Fla., assignor to Avco Manufacturing Corporation, Cincinnati, Ohio, a corporation of Delaware
Filed Feb. 9, 1959, Ser. No. 792,185
5 Claims. (Cl. 235—189)

This invention relates to resolvers and, more particularly, to a vacuum tube attenuator used to maintain constant gain in a computing servo mechanism using a resolver.

The application of the conventional resolver is to solve unknowns in a right triangle. For example, when a null seeking servo mechanism is arranged to drive the rotor to obtain a null voltage from one of the rotor windings, if the legs of the triangle are known quantities, then these quantities can be supplied as voltages to the stator windings of the resolver, and from the rotor windings can be derived a null voltage representing the angle of the rotor shaft and a control voltage representing the hypotenuse of the triangle. Since the null output voltage is proportional to the sine of the shaft angle, the sensitivity of the resolver, i.e., the voltage generated per degree of displacement from a given position, varies with angular position. This means that the gain of a servo loop employing a resolver changes with the input to the resolver, and such a condition tends to make the servo loop more oscillatory at solutions involving shaft angles close to zero and very sluggish at solutions involving angles approaching 90 degrees. Because of these gain variations, conventional servomechanism practice dictates the use of compensatory circuitry, such as a unitary gain amplifier, a potentiometer or a vacuum tube attenuator. In the attenuator, compensation is accomplished by adjusting the gain of the null voltage amplifier in accordance with variations in the control voltage.

It is the primary object of this invention to provide a servomechanism having an improved and simplified attenuator.

Another object of this invention is to provide for a resolver a null voltage amplifier having a variable impedance load and means for changing said load in accordance with the control voltage to vary the gain of the amplifier as an inverse function of the control voltage.

Another object of this invention is to maintain substantially constant the gain of a servo loop by means of an attenuator including a null signal amplifier having a variable output load regulated in accordance with the control voltage output of the resolver.

Figure 1:
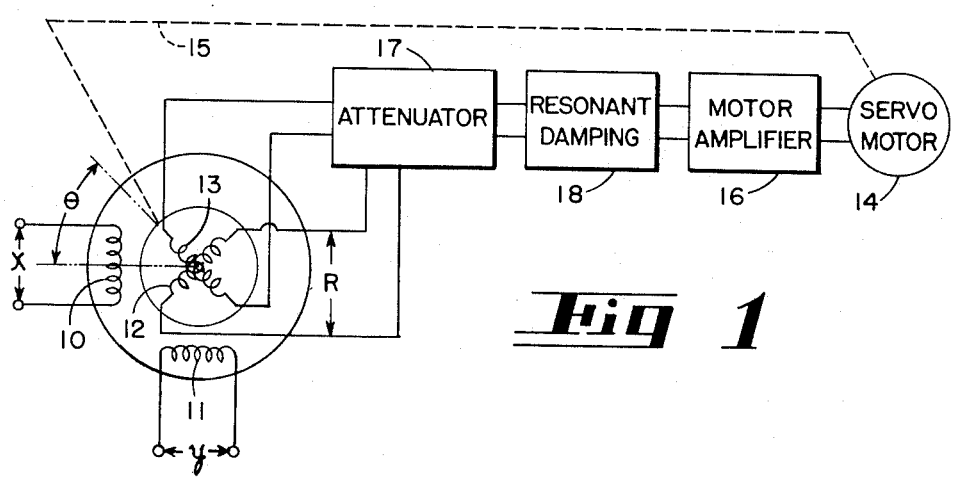
Figure 2:
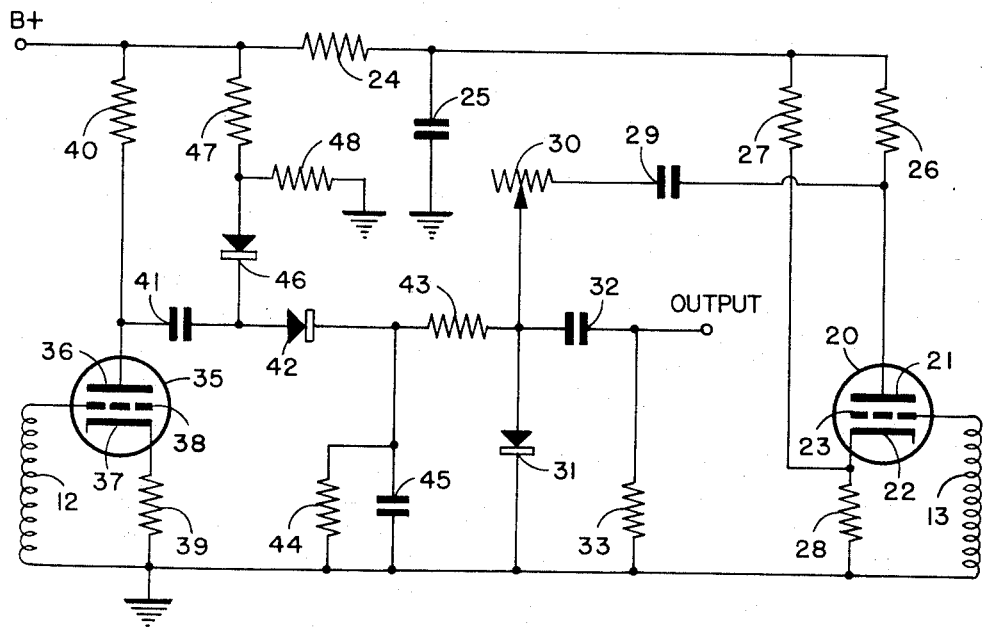

For a more complete understanding of the nature and further objects of this invention, reference should now be made to the following detailed description and to the accompanying drawings, in which:

FIG. 1 illustrates in block diagram form a servo loop employing a resolver and a vacuum tube attenuator; and
FIG. 2 is a circuit diagram of my improved vacuum tube attenuator.

The resolver illustrated in FIG. 1 employs two conventional stator windings 10 and 11 spaced 90 degrees apart and two conventional rotor windings 12 and 13 also spaced at right angles to one another. In solving trigonometric problems, if two legs of a right triangle are known quantities represented by voltages $x$ and $y$, then if the voltage $x$ is applied across the winding 10 and if the voltage $y$ is applied across the winding 11, a control voltage R representing the hypotenuse of the right triangle will be derived from across the winding 12, and a null voltage representing the shaft angle $\theta$ will be derived from across the winding 13.

For the purpose of actuating a servomotor 14 to angularly position the shaft 15, the null voltage derived from the winding 13 may be applied directly to a motor amplifier 16. However, as was noted previously, the gain of such a servo loop will not be constant. To overcome this deficiency the null output voltage from the winding 13 is applied to a vacuum tube attenuator 17, the gain of which is controlled by applying the control voltage R in a manner to be described, thus providing a constant level sensitivity in the servo loop. The output of the vacuum tube attenuator may then be applied to the amplifier 16 through the conventional resonant damping network 18.

The details of my improved vacuum tube attenuator are illustrated in FIG. 2 to which reference is now made. Generally, the attenuator contains two circuits: an amplifying circuit for null signals, and a circuit for controlling the load impedance of the null signal amplifier in accordance with control signal levels.

The amplifying circuit for the null signal voltages includes a triode 20 having a plate 21, a cathode 22 and a control grid 23 to which the null signals are applied. Operating potential for the triode 20 is supplied from the B+ supply through a filter network including resistor 24 and condenser 25 and through a plate resistor 26. Cathode bias is provided by means of the voltage-dividing network comprising the resistors 27 and 28. Amplified null signals are taken from the plate 21 by means of a condenser 29 and are applied across a variable resistor 30 and a diode 31. The amplified null signals may then be applied by means of condenser 32 and resistor 33 to the resonant damping circuit 18 and the amplifier 16 for energizing the sermomotor 15.

In order to maintain the gain of the null signal amplifying circuit constant, means are provided for varying the conductivity of the diode 31 in accordance with the voltage derived from the winding 12. That is to say, by increasing the conductivity of the diode 31 (or reducing its impedance) as the voltage R appearing across the winding 12 increases, the output from the null signal amplifying circuit decreases and the signals applied to the resonant damping circuit 19 and the motor amplifier 16 are reduced, thereby tending to stabilize operation of the servo loop.

The circuit for controlling the load impedance of the null signal amplifier, that is, the circuit for controlling the conductivity of diode 31, includes a triode 35 having a plate 36, a cathode 37 and a control grid 38. The cathode 37 is connected to ground via a cathode-biasing resistor 39 while the plate 36 is connected to the B+ supply via a plate-biasing resistor 40. Control signals derived from the winding 12 are applied to the grid 38, and the amplified control signals are taken from the plate 36 and applied to the diode 31 through a condenser 41, a second diode 42 and a limiting resistor 43. The resistor 44 and condenser 45 provide an alternating current filter between the diode 42 and resistor 43.

In operation of the circuit as thus far described, an increase in A.C. voltage at the plate 36 of triode 35 will increase the voltage rectified by diode 42 and, hence, produce an increase in voltage across the diode 31. This will cause a decrease in the impedance of the diode 31, thus reducing the null signal output voltage. Conversely, a decrease in the A.C. voltage at the plate 36 causes a decrease in voltage rectified by the diode 42, resulting in an increase in impedance of the diode 31, thus increasing the null signal output voltage.

The diode 46 is connected between the junction of resistors 47 and 48 and the diode 42, and is provided with a bias depending upon the values of resistors 47 and 48 which are connected across the B+ supply. By proper selection of resistors 47 and 48, the level of conduction of diode 46 may be chosen so as to provide the proper initial bias level for diode 42.

Diode 46 is also used for the purpose of providing a degree of full-wave rectification. That is to say, on the positive half-cycle of the signals appearing at the plate 36, the diode 42 is rendered conductive, while on the negative half-cycle, it is rendered non-conductive. However, on the negative half-cycle the diode 46 is rendered more conductive, and the increased current from the diode 46 tends to flow through the diode 42, the resistor 43 and the diode 31. Thus, the output from diode 42 tends to approach full-wave rectification with the result that there is a considerable increase in power.

The following circuit parameters are included for the purpose of aiding one skilled in the art in reproducing a workable embodiment of my invention. It is to be understood, however, that I do not intend to be limited in any way be these parameters which may be modified for the particular circumstances of each case:

Resistors:
- 24 ___ 51K ohms.
- 26 ___ 150K ohms.
- 27 ___ 1 megohm.
- 28 ___ 390 ohms.
- 30 ___ Variable to 150K ohms.
- 33 ___ 330K ohms.
- 39 ___ 1800 ohms.
- 40 ___ 180K ohms.
- 43 ___ 180K ohms.
- 44 ___ 1 megohm.
- 47 ___ 470K ohms.
- 48 ___ 180K ohms.

Condensers:
- 25 ___ .1 uf.
- 29 ___ .033 uf.
- 32 ___ .033 uf.
- 41 ___ .1 uf.
- 45 ___ .1 uf.

Diodes 31, 42 and 46 ___ Type IN457
Triodes 20 and 35 ___ Comprise the halves of a twin triode Type JAN 5751.

It will also be recognized that many modifications and adaptations will become apparent to persons skilled in the art; for example, the resolver may be operated in any of the known ways and also, transistors may be substituted for vacuum tubes. Further, other types of variable impedance devices may be substituted for the diodes. Therefore, it is my intention that the invention be limited only by the scope of the following claims as interpreted in the light of the prior art.

I claim:

1. In a control network for controlling an error signal in accordance with a related control signal, the combination comprising: an error signal amplifier having an input circuit and an output circuit, said error signal being applied across said input circuit, and a first diode connected across said output circuit; a control signal amplifier having an input circuit and an output circuit, said control signal being applied across said input circuit, and said output circuit including a second diode connected in series with said first diode; and a source of direct currents for initially biasing said first and second diodes into conduction.

2. In a control network for controlling an error signal in accordance with a related control signal, the combination comprising: an error signal amplifier having an input circuit and an output circuit, said error signal being applied across said input circuit, and a first diode connected across said output circuit; a control signal amplifier having an input circuit and an output circuit, said control signal being applied across said input circuit, and a second diode connected in series with said first diode across said output circuit; a third diode connected in a series loop with said first and second diodes; and a source of direct currents for biasing said first, second, and third diodes into conduction.

3. In a control network for controlling an error signal in accordance with a related control signal, the combination comprising: a source of direct currents; an error signal amplifier having an input, an output, and a common electrode; connections from said source for operatively biasing said electrodes; means for applying said error signal between said input and said common electrodes; a first diode connected between said output and said common electrodes; means for deriving an amplified error signal from across said first diode; a control signal amplifier having an input, an output, and a common electrode; connections from said source to said electrodes for operatively biasing said control signal amplifier; means for applying said control signal between said input and said common electrodes; a condenser; second and third series-connected diodes, the junction of said diodes being connected to said output electrode of said control signal amplifier through said condenser; and a series connection from said source through said first, second, and third diodes for biasing said diodes into conduction.

4. In a control network for controlling an error signal in accordance with a related control signal, the combination comprising: a source of direct currents; an error signal amplifier having plate, grid, and cathode electrodes; connections from said source for operatively biasing said electrodes; means for applying said error signal between said grid and cathode electrodes; a first diode connected between said plate and said cathode electrodes; means for deriving an amplified error signal from across said first diode; a control signal amplifier having plate, grid and cathode electrodes; connections from said source to said electrodes for operatively biasing said control signal amplifier; means for applying said control signal between said grid and cathode electrodes; a condenser; second and third series-connected diodes, the junction of said diodes being connected to said plate electrode of said control signal amplifier through said condenser; and a series connection from said source through said first, second, and third diodes for biasing said diodes into conduction.

5. A control circuit for use in an electromechanical resolver of the type having stator windings energized with alternating currents and having first and second rotor windings, the voltage on said first rotor winding constituting an error signal and representing the angle of said rotor windings relative to said stator windings, and the voltage on said second rotor windings constituting a control signal and representing the resultant of the voltage on said stator windings, said control network comprising: an error signal amplifier having an input circuit and an output circuit, said error signal being applied across said input circuit, and a first diode connected across said output circuit; a control signal amplifier having an input circuit and an output circuit, said control signal being applied across said input circuit, and a second diode connected in series with said first diode across said output circuit; a third diode connected in a series loop with said first and second diodes; and a source of direct currents for biasing said first, second, and third diodes into conduction.

References Cited in the file of this patent

UNITED STATES PATENTS

| | | |
|---|---|---|
| 2,448,387 | Newell et al. | Aug. 31, 1948 |
| 2,762,959 | Welch | Sept. 11, 1956 |

UNITED STATES PATENT OFFICE
CERTIFICATE OF CORRECTION

Patent No. 3,004,708            October 17, 1961

Robert A. Cunningham

It is hereby certified that error appears in the above numbered patent requiring correction and that the said Letters Patent should read as corrected below.

Column 3, line 16, for "be", first occurrence, read -- by --; column 4, lines 24 and 25, for "condition" read -- conduction --.

Signed and sealed this 3rd day of April 1962

(SEAL)
Attest:

ERNEST W. SWIDER            DAVID L. LADD
Attesting Officer            Commissioner of Patents